US012599843B2

(12) United States Patent
Sakakibara et al.

(10) Patent No.: US 12,599,843 B2
(45) Date of Patent: Apr. 14, 2026

(54) GAMEPLAY RECORDING VIDEO CREATION SYSTEM

(71) Applicants: Masahiro Sakakibara, Kyoto (JP);
Masashi Komoshita, Kyoto (JP);
RedefineArts Inc., Kyoto (JP)

(72) Inventors: Masahiro Sakakibara, Kyoto (JP);
Masashi Komoshita, Kyoto (JP)

(73) Assignees: Masahiro Sakakibara, Kyoto (JP);
Masashi Komoshita, Kyoto (JP);
RedefineArts INC., Kyoto (JP)

( * ) Notice: Subject to any disclaimer, the term of this
patent is extended or adjusted under 35
U.S.C. 154(b) by 300 days.

(21) Appl. No.: 18/044,400

(22) PCT Filed: Jul. 14, 2021

(86) PCT No.: PCT/JP2021/026431
§ 371 (c)(1),
(2) Date: Mar. 8, 2023

(87) PCT Pub. No.: WO2022/185562
PCT Pub. Date: Sep. 9, 2022

(65) Prior Publication Data
US 2023/0356096 A1 Nov. 9, 2023

(30) Foreign Application Priority Data

Mar. 5, 2021 (JP) ................................. 2021-035668

(51) Int. Cl.
*A63F 13/86* (2014.01)
*A63F 13/497* (2014.01)
*A63F 13/5252* (2014.01)

(52) U.S. Cl.
CPC ............ *A63F 13/86* (2014.09); *A63F 13/497*
(2014.09); *A63F 13/5252* (2014.09)

(58) Field of Classification Search
CPC ..... A63F 13/5252; A63F 13/497; A63F 13/86
See application file for complete search history.

(56) References Cited

U.S. PATENT DOCUMENTS 10,390,082 B2 * 8/2019 Song .................. H04N 21/8549
2008/0268961 A1 10/2008 Brook et al.
(Continued)

FOREIGN PATENT DOCUMENTS

GB 2578592 A 5/2020
JP 20066853 A 1/2006
(Continued)

OTHER PUBLICATIONS

Search Report issued on Jun. 20, 2023, in corresponding European
Application No. 21929132.5, 10 pages.
(Continued)

*Primary Examiner* — Reginald A Renwick
(74) *Attorney, Agent, or Firm* — Maier & Maier, PLLC

(57) ABSTRACT

A system to create a video of a record of playing a computer
game by a player operating a character acting in a preset
virtual space with an input terminal, includes: a progress
control unit to progress a computer game; a virtual cameras
set in the virtual space; an event information storage unit to
store information on an event which may occur during the
progress of the computer game and information associating
the event with the virtual camera; an event detection unit to
detect that an event has occurred during the progress of the
computer game; an image information acquisition unit to
acquire, when an event has occurred, image information
representing an image of the virtual space captured by a
virtual camera associated with the event; and a gameplay
recording video creation unit to create a gameplay recording
video using an image acquired by the image information
acquisition unit.

9 Claims, 7 Drawing Sheets

PITCHER CAMERA

BATTER CAMERA

RUNNER CAMERA

(56)                    References Cited

U.S. PATENT DOCUMENTS

| | | | |
|---|---|---|---|
| 2014/0364206 A1 | 12/2014 | Shiraiwa et al. | |
| 2015/0224395 A1* | 8/2015 | Trombetta | ............ A63F 13/497 |
| | | | 463/24 |
| 2017/0157512 A1* | 6/2017 | Long | ....................... A63F 13/86 |

FOREIGN PATENT DOCUMENTS

| | | |
|---|---|---|
| JP | 2014061037 A | 4/2014 |
| JP | 201513101 A | 1/2015 |

OTHER PUBLICATIONS

International Search Report and Written Opinion issued on Oct. 5, 2021 in corresponding International Application No. PCT/JP2021/026431; 12 pages.
Office Action issued on Jan. 19, 2026, in corresponding Chinese Application No. 202180062132.5, 29 pages.

\* cited by examiner

Fig. 2

| EVENT | IMAGE | VIRTUAL CAMERA 1 | VIRTUAL CAMERA 2 |
|---|---|---|---|
| GAME START | PLAYERS | | |
| PLAY BALL | | REFEREE CAMERA | |
| FIRST HIT | | BATTER CAMERA → BALL CAMERA | |
| STRIKEOUT | | CATCHER CAMERA | PITCHER CAMERA |
| CHANCE | ONE'S TEAM SUPPORT GROUP | BATTER CAMERA | |
| HOMER RUN | | PITCHER CAMERA → CENTERFIELD SCREEN CAMERA | BATTER CAMERA → CENTERFIELD SCREEN CAMERA |
| SCORE | ONE'S TEAM SUPPORT GROUP | RUNNER CAMERA | |
| PINCH | ONE'S TEAM SUPPORT GROUP | PICHER CAMERA | |
| RUN ALLOWED | | PITCHER CAMERA | MANAGER CAMERA |
| COMEBACK OF ONE'S TEAM | ONE'S TEAM SUPPORT GROUP | BATTER CAMERA → RUNNER CAMERA | |
| COMEBACK OF ONE'S OPPOSING TEAM | ONE'S OPPOSING TEAM SUPPORT GROUP | PITCHER CAMERA | |
| CHANGE OF PLAYERS | COACH | | |
| LUCKY SEVEN OF ONE'S TEAM | ONE'S TEAM SUPPORT GROUP | | |
| LUCKY SEVEN OF ONE'S OPPOSING TEAM | ONE'S OPPOSING TEAM SUPPORT GROUP | | |
| BANG-BANG PLAY | | APPROPRIATE BASE CAMERA | |
| GAME OVER | PLAYERS | SKY CAMERA | |

Fig. 3

IMAGE OF PLAYERS              IMAGE OF SUPPORT GROUP

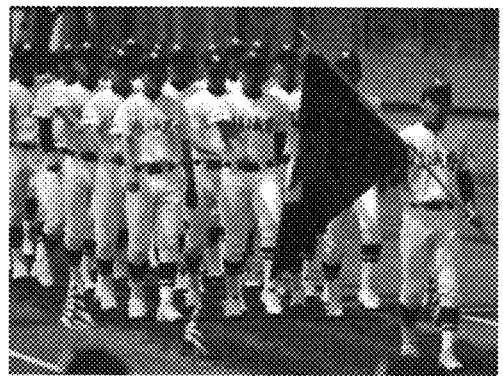 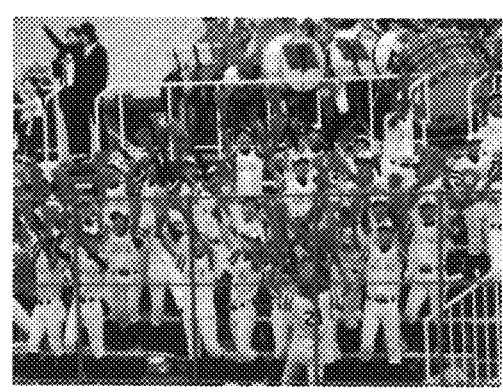

Fig. 4
PITCHER CAMERA
BATTER CAMERA
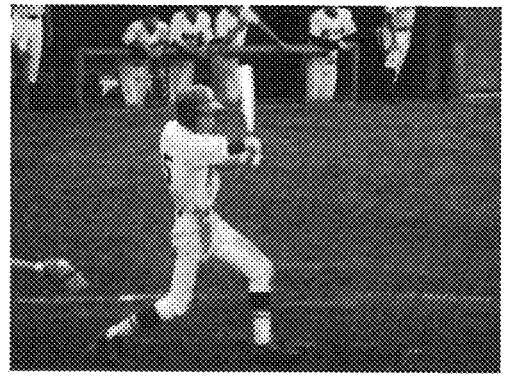
RUNNER CAMERA
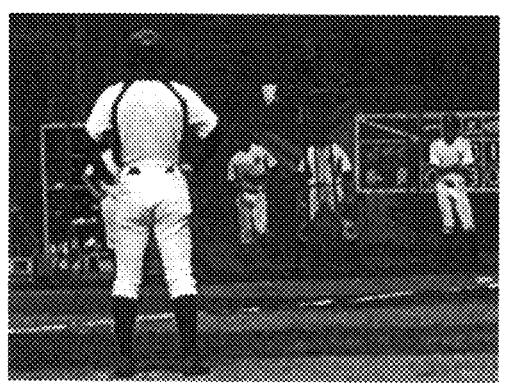

Fig. 5

| No | ELAPSE TIME | EVENT TIME | EVENT | IMAGE 1 | IMAGE 2 |
|---|---|---|---|---|---|
| 1 | 0 | 0.25 | GAME START | IMAGE OF PLAYERS | |
| 2 | 0.25 | 0.25 | PLAY BALL | REFEREE CAMERA | |
| 3 | 3 | 0.5 | FIRST HIT | BATTER CAMERA → BALL CAMERA | |
| 4 | 4 | 0.5 | CHANCE | ONE'S TEAM SUPPORT GROUP | BATTER CAMERA |
| 5 | 7 | 0.5 | PINCH | ONE'S TEAM SUPPORT GROUP | PITCHER CAMERA |
| 6 | 8 | 0.5 | RUN ALLOWED | PITCHER CAMERA | MANAGER CAMERA |
| 7 | 15 | 0.5 | COMEBACK OF ONE'S OPPOSING TEAM | PITCHER CAMERA | MANAGER CAMERA |
| 8 | 16 | 0.25 | CHANGE OF PLAYERS | MANAGER CAMERA | |
| 9 | 20 | 0.5 | LUCKY SEVEN OF ONE'S OPPOSING TEAM | ONE'S OPPOSING TEAM SUPPORT GROUP | |
| 10 | 21 | 0.5 | PINCH | ONE'S TEAM SUPPORT GROUP | PITCHER CAMERA |
| 11 | 24 | 0.5 | LUCKY SEVEN OF ONE'S TEAM | ONE'S TEAM SUPPORT GROUP | |
| 12 | 26 | 0.5 | HOME RUN | PITCHER CAMERA → CENTERFIELD SCREEN CAMERA | BATTER CAMERA → CENTERFIELD SCREEN CAMERA |
| 13 | 26 | 0.5 | COMEBACK OF ONE'S TEAM | MANAGER CAMERA | BATTER CAMERA → RUNNER CAMERA |
| 14 | 30 | 0.5 | BANG-BANG PLAY | APPROPRIATE BASE CAMERA | |
| 15 | 35 | 0.25 | GAME OVER | SKY CAMERA | |

Fig. 6

| No | ELAPSE TIME | EVENT TIME | EVENT | ORIGINAL IMAGE | EDITED IMAGE |
|----|------------|-----------|-------|----------------|--------------|
| 1 | 0 | 0.25 | GAME START | IMAGE OF PLAYERS | IMAGE OF PLAYERS |
| 2 | 0.25 | 0.25 | PLAY BALL | REFEREE CAMERA | <DELETION> |
| 3 | 3 | 0.5 | FIRST HIT | BATTER CAMERA → BALL CAMERA | <DELETION> |
| 4 | 4 | 0.5 | CHANCE | ONE'S TEAM SUPPORT GROUP | ONE'S TEAM SUPPORT GROUP |
| 5 | 7 | 0.5 | PINCH | ONE'S TEAM SUPPORT GROUP | PITCHER CAMERA |
| 6 | 8 | 0.5 | RUN ALLOWED | PITCHER CAMERA | PITCHER CAMERA |
| 7 | 15 | 0.5 | COMEBACK OF ONE'S OPPOSING TEAM | PITCHER CAMERA | PITCHER CAMERA |
| 8 | 16 | 0.25 | CHANGE OF PLAYERS | MANAGER CAMERA | <DELETION> |
| 9 | 20 | 0.5 | LUCKY SEVEN OF ONE'S OPPOSING TEAM | ONE'S OPPOSING TEAM SUPPORT GROUP | <DELETION> |
| 10 | 21 | 0.5 | PINCH | ONE'S TEAM SUPPORT GROUP | <DELETION> |
| 11 | 24 | 0.5 | LUCKY SEVEN OF ONE'S TEAM | ONE'S TEAM SUPPORT GROUP | ONE'S TEAM SUPPORT GROUP |
| 12 | 26 | 0.5 | HOME RUN | PITCHER CAMERA → CENTERFIELD SCREEN CAMERA | PITCHER CAMERA → CENTERFIELD SCREEN CAMERA |
| 13 | 26 | 0.5 | COMEBACK OF ONE'S TEAM | MANAGER CAMERA | BATTER CAMERA → RUNNER CAMERA |
| 14 | 30 | 0.5 | BANG-BANG PLAY | APPROPRIATE BASE CAMERA | APPROPRIATE BASE CAMERA |
| 15 | 35 | 0.25 | GAME OVER | SKY CAMERA | SKY CAMERA |

Fig. 7

| No | ELAPSE TIME | EVENT TIME | EVENT | IMAGE | GOOD | NOT GOOD | SCORE |
|---|---|---|---|---|---|---|---|
| 1 | 0 | 0.25 | GAME START | IMAGE OF PLAYERS | | 1 | -1 |
| 2 | 0.25 | 0.25 | PLAY BALL | REFEREE CAMERA | | 1 | -1 |
| 3 | 3 | 0.5 | FIRST HIT | BATTER CAMERA → BALL CAMERA | 3 | 2 | 1 |
| 4 | 4 | 0.5 | CHANCE | ONE'S TEAM SUPPORT GROUP | 15 | 1 | 14 |
| 5 | 7 | 0.5 | PINCH | ONE'S TEAM SUPPORT GROUP | 10 | 2 | 8 |
| 6 | 8 | 0.5 | RUN ALLOWED | PITCHER CAMERA | 7 | 3 | 4 |
| 7 | 15 | 0.5 | COMEBACK OF ONE'S OPPOSING TEAM | PITCHER CAMERA | 8 | 1 | 7 |
| 8 | 16 | 0.25 | CHANGE OF PLAYERS | MANAGER CAMERA | 3 | 6 | -3 |
| 9 | 20 | 0.5 | LUCKY SEVEN OF ONE'S OPPOSING TEAM | ONE'S OPPOSING TEAM SUPPORT GROUP | 4 | 3 | 1 |
| 10 | 21 | 0.5 | PINCH | ONE'S TEAM SUPPORT GROUP | 5 | 5 | 0 |
| 11 | 24 | 0.5 | LUCKY SEVEN OF ONE'S TEAM | ONE'S TEAM SUPPORT GROUP | 7 | 3 | 4 |
| 12 | 26 | 0.5 | HOME RUN | PITCHER CAMERA → CENTERFIELD SCREEN CAMERA | 15 | 1 | 14 |
| 13 | 26 | 0.5 | COMEBACK OF ONE'S TEAM | MANAGER CAMERA | 12 | 1 | 11 |
| 14 | 30 | 0.5 | BANG-BANG PLAY | APPROPRIATE BASE CAMERA | 9 | 0 | 9 |
| 15 | 35 | 0.25 | GAME OVER | SKY CAMERA | 10 | 1 | 9 |

Fig. 8

| No | ELAPSE TIME | EVENT TIME | EVENT | IMAGE | GOOD | NOT GOOD | SCORE |
|----|----|----|----|----|----|----|----|
| 3 | 3 | 0.5 | FIRST HIT | BATTER CAMERA → BALL CAMERA | 3 | 2 | 1 |
| 4 | 4 | 0.5 | CHANCE | ONE'S TEAM SUPPORT GROUP | 15 | 1 | 14 |
| 5 | 7 | 0.5 | PINCH | ONE'S TEAM SUPPORT GROUP | 10 | 2 | 8 |
| 6 | 8 | 0.5 | RUN ALLOWED | PITCHER CAMERA | 7 | 3 | 4 |
| 7 | 15 | 0.5 | COMEBACK OF ONE'S OPPOSING TEAM | PITCHER CAMERA | 8 | 1 | 7 |
| 9 | 20 | 0.5 | LUCKY SEVEN OF ONE'S OPPOSING TEAM | ONE'S OPPOSING TEAM SUPPORT GROUP | 4 | 3 | 1 |
| 10 | 21 | 0.5 | PINCH | ONE'S TEAM SUPPORT GROUP | 5 | 5 | 0 |
| 11 | 24 | 0.5 | LUCKY SEVEN OF ONE'S TEAM | ONE'S TEAM SUPPORT GROUP | 7 | 3 | 4 |
| 12 | 26 | 0.5 | HOME RUN | PITCHER CAMERA → CENTERFIELD SCREEN CAMERA | 15 | 1 | 14 |
| 13 | 26 | 0.5 | COMEBACK OF ONE'S TEAM | MANAGER CAMERA | 12 | 1 | 11 |
| 14 | 30 | 0.5 | BANG-BANG PLAY | APPROPRIATE BASE CAMERA | 9 | 0 | 9 |
| 15 | 35 | 0.25 | GAME OVER | SKY CAMERA | 10 | 1 | 9 |

Fig. 9

| No | IMAGE | EVENT TIME 1 | EVENT TIME 2 | EVENT TIME 3 | EVENT TIME 4 |
|----|----|----|----|----|----|
| 1 | CREATION OF AVATAR | 1 | 1 | 2 | 2 |
| 2 | PROLOGUE | 2 | 3 | 3 | 5 |
| 3 | SCENE 1 – CONVERSATION WITH NPC | 1 | 2 | 2 | 3 |
| 4 | SCENE 1 – DISCOVERY OF ITEM | 1 | 2 | 2 | 3 |
| 5 | SCENE 1 – FIGHT WITH ENEMY CHARACTER | 3 | 5 | 5 | 10 |
| 6 | SCENE 2 – CONVERSATION WITH NPC (1) | 1 | 2 | 2 | 3 |
| 7 | SCENE 2 – CONVERSATION WITH NPC (2) | 1 | 2 | 2 | 3 |
| 8 | SCENE 2 – FIGHT WITH ENEMY CHARACTER | 3 | 5 | 5 | 10 |
| 9 | SCENE 3 – CONVERSATION WITH NPC | 1 | 2 | 2 | 3 |
| 10 | SCENE 3 – DISCOVERY OF ITEM | 1 | 2 | 2 | 3 |
| 11 | SCENE 3 – FIGHT WITH ENEMY CHARACTER | 3 | 5 | 5 | 10 |
| 12 | FIGHT WITH FINAL BOSS | 5 | 10 | 10 | 15 |
| 13 | EPILOGUE | 1 | 3 | 3 | 5 |

GAMEPLAY RECORDING VIDEO CREATION SYSTEM

TECHNICAL FIELD

The present invention relates to a system for creating a gameplay recording video of a computer game such as a sport game, a role playing game, or a fighting game.

BACKGROUND

In recent years, a new field of e-sports (electronic sports) that competes for play techniques of computer games is being established. In the field of e-sports, competitions have been held to compete for the play techniques of computer games of various genres, and people called "pro-gamers" who play computer games as an occupation show advanced play techniques.

There are sites (video posting sites) on the Internet where various videos are posted and widely released. In a video posting site, many videos (gameplay recording video) which recorded screens on which computer games were played by many players including pro-gamers have been posted (for example, Patent Literature 1).

A gameplay recording video of a computer game records a play screen (player screen) displayed on a display when a player plays the game. The angle of view of the player screen is determined mainly for improving operability when the player operates a character of the computer game. For example, in a baseball game, when a player operates a pitcher to perform a pitching operation, a screen showing the direction of a catcher viewed from a mound is set as a player screen, and when the player operates a batter to perform a batting operation, a screen showing the direction of a pitcher viewed from the eyes of the catcher is set as a player screen.

PATENT LITERATURE

Patent Literature 1: JP 2015-013101 A

SUMMARY

The player screen is a screen that is defined by considering mainly the operability of a player, and the gameplay recording video that records the player screen is naturally a screen in which the player screen having the limited angle of view is repeatedly displayed. Some of the gameplay recording videos posted on the video site play contents over a long period of time, but the player him/herself gets bored as well as other players after watching a monotonous video in which similar screens are repeated.

A problem to be solved by the present invention is to provide a technology capable of creating a gameplay recording video that does not make viewers bored.

The present invention made to solve the above problems is a system for creating a video of a record of playing a computer game by a player operating a character acting in a preset virtual space with an input terminal, including:

a progress control unit configured to progress a computer game by processing an action of the character input through the input terminal based on a predetermined algorithm;

a plurality of virtual cameras set in the virtual space and each configured to capture the virtual space at a predetermined angle of view;

an event information storage unit configured to store information on a plurality of events which may occur during the progress of the computer game and information associating each of the plurality of events with one of the plurality of virtual cameras;

an event detection unit configured to detect that one of the plurality of events has occurred while the computer game is in progress;

an image information acquisition unit configured to acquire, when the event detection unit detects that one of the plurality of events has occurred, image information representing an image of the virtual space captured by a virtual camera associated with the event; and a gameplay recording video creation unit configured to create a gameplay recording video using image information acquired by the image information acquisition unit.

As the input terminal, for example, one provided with a controller for performing input through an operation button or a keyboard as an input unit may be used. Further, one provided with a motion capture for performing input by causing a camera to detect the player's movement as an input unit may be used. In addition, the input terminal may include a display unit that displays a screen (player screen) necessary for the player to play the game. The angle of view of the player screen is determined mainly for improving operability when the player operates a character of the computer game. The input terminal may be incorporated in the system of the present invention, or may be provided separately from the system of the present invention so as to be connectable to the system.

The image information acquisition unit may acquire the image information at the time when the event detection unit detects an event, or may acquire the information of the image captured by the virtual camera after the end of the play of the computer game where the image was captured at the timing when the event detection unit detected an event. In the former case, each of the plurality of virtual cameras only needs to start to capture the virtual space at the time of an instruction from the image information acquisition unit. On the other hand, in the latter case, each of the plurality of virtual cameras continuously captures the virtual space during the progress of the computer game, and records the image data in a predetermined image recording unit. Furthermore, the image information may be acquired in a normal image (video) data format or in another data format. For example, the image may be acquired in a data format in which position information and posture information of a character or the like in the virtual space at each time point are associated with information of a virtual camera selected at the time point.

In the gameplay recording video creation system for a computer game according to the present invention, a player operates a character through an input terminal. The progress control unit processes the action of the character input through the input terminal based on a predetermined algorithm. These operations are similar to general processing in a computer game. In addition to these components, the system according to the present invention uses a plurality of virtual cameras each capturing a virtual space at a predetermined angle of view. The event information storage unit stores information in which each of a plurality of events that may occur during the progress of the computer game is associated with a virtual camera, and when the event detection unit detects the occurrence of an event, the image information acquisition unit acquires image information representing an image in which the virtual space is captured with the virtual camera associated with the event. Then, the gameplay recording video creation unit creates the gameplay recording video using the image information acquired by the image information acquisition unit.

In the system according to the present invention, when one of the plurality of events stored in the event information storage unit occurs, image information representing an image in which the virtual space is captured with a virtual camera is acquired separately from the player screen, and the gameplay recording video is created using the image. Therefore, regardless of the operability of the player, it is possible to combine images of various and diversified angles of view to create a gameplay recording video that does not make the viewer feel bored.

The system according to the present invention may also be configured to:

store in the event information storage unit a second event which may occur during the progress of the computer game and image information associated with the second event;

cause the event detection unit to further detect that the second event has occurred while the computer game is in progress; and cause the image information acquisition unit to acquire the image information associated with the second event from the event information storage unit when the event detection unit detects that the second event has occurred.

During the progress of the computer game, an event that is not directly related to the action of the character may occur. For example, in the case of a baseball game, regardless of the action of a character (player character) operated by the player during the progress of the game, the offence and defense in the top and bottom of the seventh inning (lucky seven) comes. In a soccer game or the like, halftime starts at the end of the first half. Since such a second event occurs regardless of the player's operation for the character, images prepared in advance may be displayed. As such an image, for example, an image of a support group before the offence in lucky seven or during half time can be used. In the system of the above aspect, it is possible to create a gameplay recording video including display of an image stored in advance at such timing.

The system according to the present invention may further include:

an acquired image information storage unit configured to store the image information acquired by the image information acquisition unit; and a virtual camera image information storage unit configured to sequentially store image information representing images of the virtual space captured by the plurality of virtual cameras.

In the system of the above aspect, since the images in which the virtual space captured by the plurality of virtual cameras are stored in the virtual camera image information storage unit at the time of occurrence of each event, the user can confirm the video created by the gameplay recording video creation unit, and replace some of the images with images in which the virtual space has been captured by another virtual camera to edit the gameplay recording video.

The system according to the present invention may be further configured to:

associate a plurality of pieces of virtual camera and/or image information with some of the plurality of events and the second event, and cause the gameplay recording video creation unit to create a plurality of gameplay recording videos having different combinations of image information.

In the system of the above aspect, it is possible to create a plurality of types of gameplay recording videos having different images at the time of occurrence of each event.

By using the gameplay recording video creation system of a computer game according to the present invention, it is possible to create a gameplay recording video that does not make a viewer get bored.

BRIEF DESCRIPTION OF DRAWINGS

FIG. 2 is an example of events stored in an event information storage unit and image information or virtual cameras corresponding to the events in the system of the present embodiment.

FIG. 3 is an example of image information associated with an event in the system of the present embodiment.

FIG. 4 is an example of image information acquired by a virtual camera in the system of the present embodiment.

FIG. 5 is a configuration example of a gameplay recording video created in the system of the present embodiment.

FIG. 6 is a configuration example before and after editing the gameplay recording video in the system of the present embodiment.

FIG. 7 is an example of evaluation information analysis of the gameplay recording video in the system of the present embodiment.

FIG. 8 is an editing example of the gameplay recording video in the system of the present embodiment.

FIG. 9 is a configuration example in a case where a gameplay recording video of a role playing game is created using the gameplay recording video creation system of a computer game according to the present invention.

DETAILED DESCRIPTION

Figure 1:
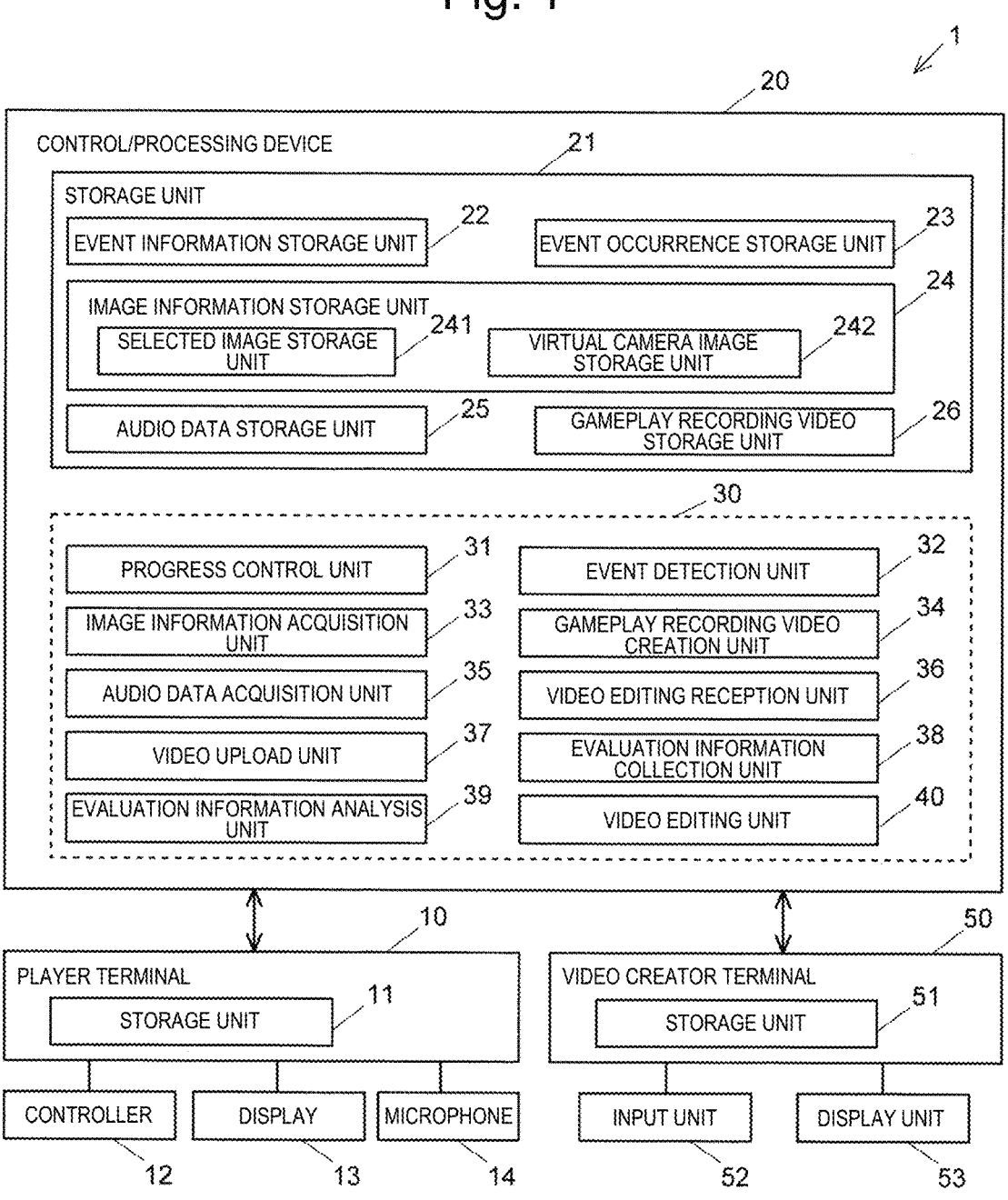
FIG. 1 is a configuration diagram of a main part of a gameplay recording video creation system of a computer game according to an embodiment of the present invention.

A gameplay recording video creation system of a computer game according to the present invention will be described below with reference to the drawings. In the present embodiment, a case where a gameplay recording video of a baseball game is created will be described as an example.

FIG. 1 is a configuration diagram of a main part of a gameplay recording video creation system 1 (hereinafter, it is also simply referred to as a "system") of a computer game according to the present embodiment. The system 1 of the present embodiment roughly includes a player terminal 10 (corresponding to an input terminal in the present invention), a video creator terminal 50, and a control/processing device 20 provided to be able to communicate with the player terminal 10 and the video creator terminal 50.

The player terminal 10 is a terminal used by a person (player) playing the computer game. The player terminal 10 includes a storage unit 11, a controller (operation input unit) 12 for the player to operate a character that acts in a virtual space in a computer game, a display (display unit) 13 on which a player screen displaying the action of the character is displayed, and a microphone (voice input unit) 14 that picks up the voice of the player. Instead of the controller, a motion capture, a keyboard, or the like may be used.

The video creator terminal 50 is a terminal used by a person (video creator) who intends to create a gameplay recording video of the computer game. The video creator terminal 50 includes a storage unit 51, and an input unit 52 and a display unit 53 are connected.

The control/processing device 20 includes a storage unit 21, and further includes, as functional blocks, a progress control unit 31, an event detection unit 32, an image information acquisition unit 33, a gameplay recording video creation unit 34, an audio data acquisition unit 35, a video editing reception unit 36, a video upload unit 37, an evaluation information collection unit 38, an evaluation information analysis unit 39, and a video editing unit 40. The entity of the control/processing device 20 is, for example, a general personal computer, a server computer, or a game machine, and these functional blocks are embodied by executing a gameplay recording video creation program 30 installed in the entity in advance by a processor.

The storage unit 21 is provided with an event information storage unit 22, an event occurrence storage unit 23, an image information storage unit 24, an audio data storage unit 25, and a gameplay recording video storage unit 26.

The event information storage unit 22 stores information on a plurality of events that may occur during the play of the baseball game. These events are, for example, a game start, a play ball, a first hit, a strikeout, a chance (a runner of one's team in scoring position), a home run, a score, a pinch (a runner of one's opposing team in a scoring position), a run allowed, a comeback by one's team, a comeback by one's opposing team, a change of players, a lucky seven of one's team, a lucky seven of one's opposing team, a bang-bang play, and a game over, as illustrated in FIG. 2.

Furthermore, information or image information of one or a plurality of virtual cameras is associated with each of these events. The event associated with the information of the virtual camera corresponds to an event in the present invention, and the event associated with the image information corresponds to a second event in the present invention. However, these are merely classifications of convenience, and some of the events of the present embodiment are associated with both the information of the virtual camera and the image information. Among the events, a comeback event may occur at the same time as an event of a score or a run allowed. With respect to such events, one (here, comeback) of the events is set as an event higher than the other events (score, run allowed). The higher event is determined so as to satisfy the occurrence requirements of both the event and the lower events when the event occurs. Such examples include a home run event (higher event) and a score (lower event). Note that the "image" described in the present description may include both a video and a still image.

The virtual cameras include, for example, a camera arranged so as to catch the pitcher on the mound with the eyes of the catcher (hereinafter, this virtual camera is referred to as a "pitcher camera"), a camera arranged so as to catch the catcher from the mound with the eyes of the pitcher (hereinafter, this virtual camera is referred to as a "catcher camera"), a camera arranged so as to catch the runner (hereinafter, this virtual camera is referred to as a "runner camera"), a camera arranged so as to catch a chief referee (hereinafter, this virtual camera is referred to as a "chief referee camera"), a camera arranged so as to catch the entire field from the centerfield screen (hereinafter, this virtual camera is referred to as a "centerfield screen camera"), a camera arranged so as to catch each of a first base, a second base, a third base, and a main base from a predetermined direction (hereinafter, these virtual cameras are referred to as a "first-base camera", a "second-base camera", a "third-base camera", and a "third-base camera"), and a camera arranged so as to catch the entire field from above in the virtual space (hereinafter, this virtual camera is referred to as a "sky camera"). The positions and angles of views of these virtual cameras are fixed.

Furthermore, the virtual cameras also include a camera arranged at a position where each player of one's team including a character (player character (PC)) appearing in the game, each player of one's opposing team, a non-player character (NPC) such as a manager or a coach of one's team, or a ball, is captured at a predetermined angle of view (hereinafter, this virtual camera is referred to as a "manager camera" or the like). The non-player character may include a character other than a person, such as a baseball in a play. The positions and orientations of these virtual cameras are automatically changed following the movement of the character in the virtual space.

The image information includes, for example, images of players of one's team, images of support groups of one's team and one's opposing team, and images of managers of one's team and one's opposing team.

The event occurrence storage unit 23 stores information regarding the event that has occurred during the play of the game and its occurrence time.

The image information storage unit 24 is provided with a selected image information storage unit 241 and a virtual camera image information storage unit 242. The selected image information storage unit 241 stores image information that is associated with an event detected by the event detection unit 32 to be described later and that has been acquired by the image information acquisition unit 33 to be described later. As illustrated in FIG. 3, the image information includes, for example, an image of players and an image of a support group.

The virtual camera image information storage unit 242 stores information of an image of a virtual space captured by a virtual camera described later during play. FIG. 4 illustrates an example of an image of the virtual space captured by the virtual camera (examples of images captured by a pitcher camera, a batter camera, and a runner camera). The image information of the virtual space acquired by each virtual camera is sequentially stored in the virtual camera image information storage unit 242 in units of one play (for example, a unit in which a series of plays is completed such that a pitcher throws a ball, a batter hits the ball, the batted ball is caught and thrown to the first base, and an out/safe judgment is made by a referee) regardless of the occurrence of each event.

The audio data storage unit 25 sequentially stores, in units of one play, the commentary audio and the sound effect (ball hitting sound, ball catching sound, and the like) given based on a predetermined algorithm during the progress of the game by the progress control unit 31 described later, regardless of the occurrence of each event. In addition, the audio data storage unit 25 also stores audio data input through the microphone 14 of the player terminal 10 during the play of the game.

The progress control unit 31 progresses the game according to a predetermined algorithm. In addition, the progress control unit 31 displays a screen (player screen) necessary for the player to play the game on the display 13 of the player terminal 10, and processes an input signal from the controller 12. The angle of view of the player screen is determined mainly for improving operability when the player operates a character of the computer game. When a player operates a pitcher to perform a pitching operation during play of a baseball game of the present embodiment, a screen showing the direction of a catcher viewed from a mound is set as a player screen, and when the player operates a batter to perform a batting operation, a screen showing the direction of a pitcher viewed from the eyes of the catcher is set as a player screen. These functions are similar to those of conventional computer games. The progress control unit 31 of the present embodiment further sets a stadium in which a baseball game is played as a virtual space, and arranges each of the plurality of virtual cameras in the virtual space.

The event detection unit 32 monitors the progress of the computer game and detects the occurrence of one of the plurality of events stored in the event information storage unit 22.

When the event detection unit 32 detects an event, the image information acquisition unit 33 collects image information associated with the event and/or image information of the virtual space acquired by the plurality of virtual cameras, and stores the image information in the selected image information storage unit 241. Note that the image of the virtual space acquired by the virtual camera is stored as data in which information for specifying the virtual camera is associated with position information and posture information of a character or the like in the virtual space at each time point. The image of the virtual space acquired by the virtual camera can be stored in an image data format or a video data format, and the file size can be reduced by storing the image as data of the above format. Furthermore, editing after the gameplay recording video is created is also facilitated.

The gameplay recording video creation unit 34 creates a gameplay recording video using the image information acquired by the image information acquisition unit 33 and stored in the selected image information storage unit 241.

The audio data acquisition unit 35 sequentially stores, in the audio data storage unit 25, data of the commentary voice and the sound effect during the progress of the game, and the voice of the player input through the microphone 14 of the player terminal 10 during the play of the game.

The video editing reception unit 36, the video upload unit 37, the evaluation information collection unit 38, the evaluation information analysis unit 39, and the video editing unit 40 are used when the video is edited after the gameplay recording video is created. These functions will be described later together with a specific processing flow.

Next, the operation of each unit of the system 1 of the present embodiment will be described. The player of the game and the video creator may be the same or different. Here, it is assumed that these are different. For example, in a case where a person who provides a game on the server computer creates a recording video of a game played by a player through the network and provides the recording video to the player, the player and the video creator are different from each other. Alternatively, in a case where a player intends to create a gameplay video of the player, the player and the video creator are the same. In this case, a terminal in which both the player terminal 10 and the video creator terminal 50 are integrated can be used. Note that the functions, by the progress control unit 31, of displaying a player image on the display 13 of the player terminal 10 and the function of processing the input from the controller 12 are similar to those of the conventional computer game, and thus their descriptions will be omitted.

When the player instructs the start of the baseball game, the progress control unit 31 sets a stadium in which the baseball game is going to be played as a virtual space, and sets the plurality of virtual cameras in it. Image information representing images in which the virtual space (including characters arranged in the virtual space) is captured by each virtual camera are sequentially stored in the virtual camera image information storage unit 242 for each play.

When the baseball game is started, the event detection unit 32 monitors the progress of the game and detects the occurrence of an event. First, the event detection unit 32 detects a game start event. When the event detection unit 32 detects the event of the game start, the image information acquisition unit 33 reads player images that are the images associated with the event of the game start stored in the event information storage unit 22, and stores the player images in the selected image information storage unit 241.

After detecting the event of the game start, the event detection unit 32 subsequently detects the event of the play ball. When the event detection unit 32 detects the event of the play ball, the image information acquisition unit 33 reads a referee image that is the information associated with the event of the play ball stored in the image information storage unit, and stores the referee image in the selected image information storage unit 241.

The event detection unit 32 continues to monitor the progress of the game even after the start of the game, and detects the occurrence of one of the plurality of events stored in the event information storage unit 22. For example, an event is detected in an offence inning of one's team when a first hit is made, when a chance comes at one's team, when a score is achieved, and in an offence inning of one's opposing team when a pinch comes at one's team, or when a run is allowed. In addition, a lucky seven of one's team and a lucky seven of one's opposing team are also each detected as an event. Note that, for example, the comeback by one's team corresponds to both the event of the comeback and the event of the score, but is detected as the occurrence of the event of the comeback, which is a higher event.

Unlike the game start and the play ball described above, an event such as a first hit or a score occurs at the time when the one play is completed. Therefore, in order to create a gameplay recording video of these events, it is necessary to acquire image information before the time point at which the event detection unit 32 detects the event. For example, in a case where the event detection unit 32 detects an event in which one's team has made the first hit, the moment of the hit ends at the time when the event is detected. In a case where such an event is detected, the image information acquisition unit 33 refers to the image information stored in the virtual camera image information storage unit 242, and acquires information of an image of one play in which the hit has occurred. For the event of the first hit, a combination of the image information acquired by the batter camera in the time until the ball hits the bat and the image information acquired by the sky camera in the subsequent time zone is acquired (see FIG. 2). The image information acquisition unit 33 stores the acquired image in the selected image information storage unit 241.

In addition, some events are associated with a plurality of pieces of image information and/or virtual cameras. For example, two cameras of the pitcher camera and the manager camera are associated with an event of run allowed. When such an event is detected, the image information acquisition unit 33 acquires each of the plurality of images and stores them in the selected image information storage unit 241. In addition, for example, one's team support group image and the batter camera are associated with an event of a chance. In a case where such an event is detected, the image information acquisition unit 33 reads out from the event information storage unit 22 the image information associated with the event, acquires an image in which the virtual space (here, the batter) is captured by the batter camera, and stores each image in the selected image information storage unit 241.

Until the game ends, detection of an event by the event detection unit 32, acquisition of an image by the image information acquisition unit 33, and storage in the selected image information storage unit 241 are sequentially performed.

When the game ends, the gameplay recording video creation unit 34 creates a gameplay recording video using the image information stored in the selected image information storage unit 241.

FIG. 5 illustrates a configuration example of a video stored in the selected image information storage unit 241 when a game ends. As illustrated in FIG. 5, after the start of the game, the image information is sequentially stored in the selected image information storage unit 241 in time series as the game progresses. In addition, for some of the events, a plurality of pieces of image information are stored in the selected image information storage unit 241. The elapsed time in FIG. 5 is the elapsed time from the start of the play. Furthermore, the event time is the time of one play related to the event, which is the time when the image of the event is displayed in the gameplay recording video.

The gameplay recording video creation unit 34 reads image information associated with each event and creates a video in which the image information is connected. Here, in a case where there is an event associated with a plurality of pieces of image information, a plurality of types of gameplay recording videos having different combinations of images are created using the events one by one. In addition, the image information of each event included in each gameplay recording video is associated with the data of the commentary voice or the sound effect being played and the voice uttered by the player.

In the example illustrated in FIG. 5, two pieces of image information are stored for each of seven events (event 4: chance, event 5: pinch, event 6: run allowed, event 7: comeback of one's opponent team, event 10: pinch, event 12: home run, and event 13: comeback of one's team). Therefore, in this case, 128 gameplay recording videos having different combinations of images are created. In this example, a gameplay recording video of 6.5 minutes (sum of event times) is created. The gameplay recording video creation unit 34 stores the gameplay recording video in the storage unit 21, and displays a screen notifying that the creation of the gameplay recording video is finished on the display unit 53 of the video creator terminal 50. Here, the videos corresponding to all the combinations are created, but in a case where the number of combinations is enormous, the gameplay recording video creation unit 34 may randomly extract some combinations from all the combinations and create only the videos corresponding them.

When the video creator instructs downloading of the gameplay recording video by the operation through the input unit 52 after confirming the notification indicating that the creation of the gameplay recording video is finished, the file of the gameplay recording video is downloaded to the video creator terminal 50 and stored in the storage unit 51.

Furthermore, when the video creator instructs confirmation of the gameplay recording video, a list of the created gameplay recording videos and play buttons are displayed. The video creator can view each video by pressing the play button of each video. When checking each video, ON/OFF can be switched for each of the commentary and the sound effect, and the audio data of the player. For example, when the audio data of the player OFF is selected, only audio data such as a play commentary of a baseball game is played. When the audio data of the player ON is selected, a voice uttered by the player during the play of the game is also output in addition to a voice such as the play commentary.

The gameplay recording video created as described above is created from an image stored in advance or an image in which a virtual space is captured with a virtual camera. Since these images are varied images irrelevant to the operability of the player, it is possible to create a gameplay recording video that does not make the viewer bored.

The video creator can appropriately view the 128 types of created gameplay recording videos, post the most favorite video among them to a video posting site, and allow others to view it.

Furthermore, the video creator can also edit the gameplay recording video created by the gameplay recording video creation unit 34. When the video creator instructs editing of the gameplay recording video, the video editing reception unit 36 causes the video creator to designate a file of the gameplay recording video to be original data of editing.

When the video creator specifies a target file, the video editing reception unit 36 causes the video creator to specify an editing portion of the gameplay recording video. For example, the editing portion can be designated by causing the video creator to select an event number. In the present embodiment, it is possible to delete an image of the portion, replace an image of the portion, or add an image to the portion.

When the video creator instructs deletion of an image of the portion, image information of the portion (event) designated by the video creator is deleted.

When the video creator gives an instruction to replace the image of the portion, the video editing reception unit 36 reads the image information acquired by each virtual camera during the play of the baseball game and stored in the virtual camera image information storage unit 242, and causes the video creator to select one of the virtual cameras. When the video creator selects one of the virtual cameras, the image information of the virtual space acquired by the virtual camera at the editing portion (event) designated by the video creator is read from the virtual camera image information storage unit 242 and is replaced with the image information previously included in the gameplay recording video.

When the video creator designates a portion between two events and gives an instruction to add an image, the video editing reception unit 36 reads image information acquired by each virtual camera during the play of the baseball game and stored in the virtual camera image information storage unit 242, and causes the video creator to select one of the virtual cameras, similarly to the time of image replacement. When the video creator selects one of the virtual cameras, the video editing reception unit 36 displays in time series the image information acquired by the virtual camera between the two events designated by the video creator. When the video creator designates image information in a desired time range from the displayed time-series image information, the image information acquired by the virtual camera designated by the video creator in the time range designated by the video creator is inserted into the editing portion previously designated by the video creator.

FIG. 6 illustrates an editing example of the gameplay recording video. In this example, the image information of events 2, 3, and 8 to 10 is deleted, and the image information of events 5 and 13 is changed. By deleting these pieces of image information, the playing time of the gameplay recording video is shortened from 6.5 minutes to 4.5 minutes.

In the system of the present embodiment, a plurality of gameplay recording videos created during one play of a baseball game can be further disclosed on a video posting site or the like on the Internet, and evaluation of each gameplay recording video can be received from a viewer.

When an instruction is given to upload the gameplay recording video created by the gameplay recording video creation unit 34 and/or the gameplay recording video obtained by editing the above video by the video editing reception unit 36, the video upload unit 37 uploads the videos to a video posting site on a predetermined Internet server. Here, the gameplay recording video is uploaded to a video posting site on the Internet server by the video upload unit 37, and evaluation is received from an unspecified number of viewers, but the gameplay recording video may be transmitted to predetermined viewers (for example, people registered as users of the present system), and the evaluation may be received only from those viewers.

When the viewer who has accessed the Internet server instructs playing of any video, an evaluation button (good, not good) is displayed on the viewing screen simultaneously with playing the video. When the viewer presses any one of the evaluation buttons during playing the video, the evaluation information collection unit 38 collects information (evaluation information) in which information (good, not good) of the pressed button is associated with a pressed time.

When the viewer views the video to the end, the evaluation information collection unit 38 stores the evaluation information collected so far in an evaluation information storage unit 27 in association with information (for example, a file name) of the viewed video. When the viewer stops playing the video in the middle, it is considered that the image displayed at that time has not attracted the interest of the viewer, and the evaluation information collection unit 38 acquires the information of the time when playing is stopped (playing time), adds the evaluation of "not good" to the playing time, and stores the evaluation information in the evaluation information storage unit 27 in association with the information of the video viewed together with the evaluation information collected so far.

When a predetermined period (for example, one week) elapses after the gameplay recording video is uploaded by the video upload unit 37, the evaluation information analysis unit 39 aggregates evaluations given to the gameplay recording video.

First, a case where the evaluation information is collected only for one gameplay recording video will be described.

FIG. 7 illustrates an example of an analysis result by the evaluation information analysis unit 39. In this example, the evaluation information analysis unit 39 calculates scores by subtracting the number of "not good" evaluations from the number of "good" evaluations given to the image of each event included in the gameplay recording video.

When the scores are calculated as illustrated in FIG. 7, the video editing unit 40 deletes the image information of the event in which the score does not satisfy a predetermined standard, and creates a new gameplay recording video. For example, in a case where the score is 0 or more as a standard, a new gameplay recording video is created by the video editing unit 40 as illustrated in FIG. 8. As a result, it is possible to delete a portion evaluated as "not good" by the viewers (an image that the viewers do not feel attractive) and create a gameplay recording video that attracts more interest of the viewers.

Next, a case where evaluation information is collected for a plurality of gameplay recording videos will be described.

Also in this case, similarly to the above, the evaluation information analysis unit 39 calculates a score for each event included in each of the plurality of gameplay recording videos.

Next, the evaluation information analysis unit 39 aggregates (for example, averages) the scores obtained for the same event and the same image information. Then, the image information of the event in which the aggregated value is less than the predetermined standard is deleted. The standard may be, for example, an average value of 0 or more in the same manner as described above. In a case where a plurality of total values (that is, total values of the same event but different pieces of image information) related to the same event remain at this point of time, the highest total value is selected.

The video editing unit 40 arranges in order of elapsed time the image information selected by the above processing to create a new gameplay recording video. As a result, it is possible not only to delete the portion evaluated as "not good" by the viewers, but also to automatically create an attractive gameplay recording video in which pieces of image information evaluated as "good" by the viewers are combined.

Furthermore, the video editing unit 40 may be configured to cause the video creator to designate the length of the video shorter than the original gameplay recording video, and extract the combination of the event and the image information in descending order of the score or the aggregation point within a range falling within a time equal to or shorter than the length. As a result, it is possible for the video creator to create an arbitrary length of a gameplay recording video in which scenes attracting the interest of the viewers are collected.

The above-described embodiment is merely an example, and can be appropriately modified in accordance with the spirit of the present invention.

In the above embodiment, the image information is acquired by arranging the virtual cameras in the virtual space separately from the player screen, but the player screen may be associated instead of the pitcher camera or the batter camera. This makes it possible to reduce the number of virtual cameras and reduce the load on the processor.

In the above embodiment, the gameplay recording video is created using the image information associated with all the events detected by the event detection unit 32. That is, the case has been described where the gameplay recording video creation unit 34 first creates the gameplay recording video including the scenes of all events and then the video creator appropriately edits (deletes) the gameplay recording video, but it is also possible to configure such that the video creator specifies the length of the gameplay recording video at a point of time before playing the game in advance, and the gameplay recording video creation unit 34 creates the gameplay recording video within the length. Specifically, for example, the events stored in the event information storage unit 22 may be prioritized, and the image information may be extracted in descending order of priority from among all the events occurring during the play of the game to create the gameplay recording video. For example, in the case of a baseball game, the number of generated events may be greatly different between the case of a batting duel and the case of a pitching duel, and in the method of the above example, when the gameplay recording video creation unit 34 creates the gameplay recording video of the batting duel, it may become a long video, but adopting the above configuration allows the gameplay recording video having a certain length to be created regardless of the play content.

In the above embodiment, image information having a length of one play unit is acquired regardless of whether an event is associated with a still image, a video, or an image (video) acquired by a virtual camera, but image information having a different length may be acquired depending on the type of image. For example, in the case of a still image, display for several seconds is considered to be sufficient, and therefore, in the case where the image information associated with the event is a still image, the gameplay recording video may be created so as to display the image only for a shorter time than in the case of a video.

The above embodiment is configured to acquire the image information for one play regardless of the content of the event, but the length of acquiring the image information may be changed depending on the type of the event. Furthermore, in the above-described embodiment, a plurality of virtual cameras are associated with some events, and image information of the same length (for one play) acquired by the plurality of virtual cameras is acquired, but image information of different times acquired by one virtual camera may be further associated. For example, in the case of an event of a chance, image information of only one play in which the out/safe of a batter is determined (for example, only a play image related to a third ball pitched to the batter) is acquired in the above embodiment, but image information of a plurality of plays until the out/safe of the batter is determined after the batter stands at bat can be configured to be acquired.

In the above embodiment, the case where the gameplay recording video of the baseball game is created has been described, but the similar system can be used for other sport games such as a soccer game, a tennis game, and a basketball game. In addition, the system of the present invention can be applied not only to sport games but also to computer games of different genres such as shooting games, fighting games, and role playing games.

In the role playing game, typically, the game progresses while achieving one or a plurality of preset events (conversation with a non-player character, fight with an enemy character, discovery of an item, and the like) in each of one or a plurality of scenes prepared in advance.

Therefore, it is possible to create the gameplay recording video by incorporating image information acquired by the virtual camera corresponding to the character player at the time of occurrence of the event by setting that satisfying the above-described achievement condition as an event in the above-described embodiment in advance.

In addition, an image in which a process for the player to create an avatar of the player character in the roll playing game is recorded, a prologue of a story, and an epilogue of a story may be combined with the image information acquired by the virtual camera of the player character. Adopting such a configuration allows a gameplay recording video to be created in a story style. Furthermore, similarly to the above embodiment, a plurality of types of gameplay recording videos can be created. FIG. 9 illustrates an example of parameters in a case where a plurality of gameplay recording videos having different lengths is created.

REFERENCE SIGNS LIST

1 . . . Gameplay Recording Video Creation System
10 . . . Player Terminal
11 . . . Storage Unit
12 . . . Controller
13 . . . Display
14 . . . Microphone
20 . . . Control/Processing Device
21 . . . Storage Unit
22 . . . Event Information Storage Unit 23 . . . Event Occurrence Storage Unit
24 . . . Image Information Storage Unit
241 . . . Selected Image Information Storage Unit
242 . . . Virtual Camera Image Information Storage Unit
25 . . . Audio Data Storage Unit
26 . . . Gameplay Recording Video Storage Unit
27 . . . Evaluation Information Storage Unit
30 . . . Program for Gameplay Recording Video Creation
31 . . . Progress Control Unit
32 . . . Event Detection Unit
33 . . . Image Information Acquisition Unit
34 . . . Gameplay Recording Video Creation Unit
35 . . . Audio Data Acquisition Unit
36 . . . Video Editing Reception Unit
37 . . . Video Upload Unit
38 . . . Evaluation Information Collection Unit
39 . . . Evaluation Information Analysis Unit
40 . . . Video editing unit
50 . . . Video Creator Terminal
51 . . . Storage Unit
52 . . . Input Unit
53 . . . Display Unit

The invention claimed is:

1. A gameplay recording video creation system configured to create a video of a record of playing a computer game by a player operating a character acting in a preset virtual space with an input terminal, the gameplay recording video creation system comprising:

a progress control unit configured to progress a computer game by processing an action of the character input through the input terminal based on a predetermined algorithm;

a plurality of virtual cameras set in the virtual space and each configured to capture the virtual space at a predetermined angle of view;

an event information storage unit configured to store information on a plurality of events which may occur during progress of the computer game and information associating each of the plurality of events with one of the plurality of virtual cameras;

an event detection unit configured to detect that one of the plurality of events has occurred while the computer game is in progress;

an image information acquisition unit configured to acquire, when the event detection unit detects that one of the plurality of events has occurred, image information representing an image of the virtual space captured by a virtual camera associated with the event;

a gameplay recording video creation unit configured to create a gameplay recording video using image information acquired by the image information acquisition unit;

an evaluation information collection unit configured to collect an evaluation for image information of each event included in the gameplay recording video; and a video editing unit configured to, when the evaluation on the image information of each event does not satisfy a predetermined standard, delete the image information of the event and create a new gameplay recording video.

2. The gameplay recording video creation system according to claim 1, wherein the event information storage unit is configured to store a second event which may occur during the progress of the computer game and image information associated with the second event,

the event detection unit is configured to further detect that the second event has occurred while the computer game is in progress, and the image information acquisition unit is configured to acquire image information associated with the second event from the event information storage unit when the event detection unit detects that the second event has occurred.

3. The gameplay recording video creation system according to claim 1, further comprising:

an acquired image information storage unit configured to store the image information acquired by the image information acquisition unit; and a virtual camera image information storage unit configured to sequentially store image information representing images of the virtual space captured by the plurality of virtual cameras.

4. The gameplay recording video creation system according to claim 2, wherein a plurality of pieces of virtual camera and/or image information is associated with some of the plurality of events and the second event, and the gameplay recording video creation unit is configured to create a plurality of gameplay recording videos having different combinations of image information.

5. A gameplay recording video creation system configured to create a video of a record of playing a computer game by a player operating a character acting in a preset virtual space with an input terminal, the gameplay recording video creation system comprising:

a progress control unit configured to progress a computer game by processing an action of the character input through the input terminal based on a predetermined algorithm;

a plurality of virtual cameras set in the virtual space and each configured to capture the virtual space at a predetermined angle of view;

an event information storage unit configured to store information on a plurality of events which may occur during progress of the computer game and information associating each of the plurality of events with one of the plurality of virtual cameras;

an event detection unit configured to detect that one of the plurality of events has occurred while the computer game is in progress;

an image information acquisition unit configured to acquire, when the event detection unit detects that one of the plurality of events has occurred, image information representing an image of the virtual space captured by a virtual camera associated with the event; and a gameplay recording video creation unit configured to create a gameplay recording video using image information acquired by the image information acquisition unit, wherein a plurality of pieces of virtual camera and/or image information is associated with some of the plurality of events and the second event, and the gameplay recording video creation unit is configured to create a plurality of gameplay recording videos having different combinations of image information, the gameplay recording video creation system, further comprising:

an evaluation information collection unit configured to collect an evaluation for image information of each event included in each gameplay recording video, for each of the plurality of play recording videos;

an evaluation information analysis unit configured to aggregate evaluations collected for each of the combinations of the event and the image information; and a video editing unit configured to create a new gameplay recording video using a combination of the event and the image information having a high aggregated result.

6. The gameplay recording video creation system according to claim 1, wherein the plurality of virtual cameras are associated with one of the plurality of events, and the image information acquisition unit is configured to acquire images of the virtual space captured by the plurality of virtual cameras associated with the event concerned.

7. The gameplay recording video creation system according to claim 1, wherein at least one of the plurality of virtual cameras is associated with a plurality of events.

8. The gameplay recording video creation system according to claim 1, wherein the one of the plurality of virtual cameras is arranged to catch a predetermined target related to the event concerned.

9. The gameplay recording video creation system according to claim 1, wherein the image information representing the image of the virtual space captured by the virtual camera associated with the event is associated with position information and posture information of the character.

* * * * *